US010679472B2

(12) United States Patent
D'Ambrosio et al.

(10) Patent No.: US 10,679,472 B2
(45) Date of Patent: Jun. 9, 2020

(54) FLOATING INTERNAL LUMINESCENT LIGHTING

(71) Applicant: Plantronics, Inc., Santa Cruz, CA (US)

(72) Inventors: Jeremy Jacob D'Ambrosio, Soquel, CA (US); Chase Patrick Bailey, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/014,849

(22) Filed: Jun. 21, 2018

(65) Prior Publication Data

US 2019/0392687 A1   Dec. 26, 2019

(51) Int. Cl.
G08B 5/36         (2006.01)
F21V 8/00         (2006.01)
F21V 14/00        (2018.01)
G08B 21/18        (2006.01)
F21Y 113/10       (2016.01)

(52) U.S. Cl.
CPC .............. G08B 5/36 (2013.01); F21V 14/006 (2013.01); G02B 6/001 (2013.01); G08B 21/18 (2013.01); F21Y 2113/10 (2016.08)

(58) Field of Classification Search
CPC ......... G08B 5/36; G08B 21/18; F21V 14/006; G02B 6/001; F21Y 2113/10
See application file for complete search history.

(56) References Cited

U.S. PATENT DOCUMENTS

| | | | |
|---|---|---|---|
| 6,402,358 B1 | 6/2002 | Larimer | |
| 7,566,157 B2 | 7/2009 | Lo | |
| 8,724,942 B2 | 5/2014 | Logunov et al. | |
| 8,967,845 B2 | 3/2015 | Bennett et al. | |
| 9,005,115 B2 * | 4/2015 | Vayser | A61B 1/00096 600/182 |
| 2008/0144330 A1 * | 6/2008 | Buelow | G02B 6/001 362/551 |
| 2009/0113311 A1 * | 4/2009 | Fried | G06Q 10/10 715/753 |
| 2011/0021882 A1 * | 1/2011 | Selover | A61B 17/02 600/245 |
| 2011/0238139 A1 * | 9/2011 | Gowda | A61N 5/062 607/88 |
| 2014/0268864 A1 * | 9/2014 | Lee | G02B 6/0008 362/558 |
| 2016/0296719 A1 * | 10/2016 | Geraghty | A61M 16/0486 |
| 2018/0246270 A1 * | 8/2018 | Di Trapani | F21S 8/04 |

* cited by examiner

*Primary Examiner* — Tracie Y Green
(74) *Attorney, Agent, or Firm* — Haynes Beffel & Wolfeld LLP

(57) ABSTRACT

A visual task or status indicator comprises a tube having a riser region extending away from a base and an illumination output region distal to the riser region. The tube has the tube wall comprising an optical diffuser material. A waveguide, such as a polycarbonate strand or other optical fiber or a bundle of optical fibers, is enclosed within and extends through the riser region into the illumination output region of the tube. The waveguide is configured to emit light laterally in the illumination output region. A light source is coupled to the waveguide. The light source can have a plurality of output light modes, including various colors or intensities or patterns of colors and intensities. Control circuitry is connected to the light source to select the output light modes in response to a control signal. A plurality of indicators can be controlled from a central control hub.

8 Claims, 6 Drawing Sheets

FLOATING INTERNAL LUMINESCENT LIGHTING

BACKGROUND

Field

The present invention relates to systems and devices for providing visual indications of status or tasks usable in open office environments, on equipment and in other settings.

Description of Related Art

Open office environments are used in many businesses, where they can promote collaboration among workers while making efficient utilization of office space. A problem associated with open office environments relates to privacy and distraction that can be caused by activity of coworkers in the space.

Technologies have been developed to reduce distraction by, for example, projecting sounds, such as so-called white or pink noise, into the environment that mask distracting sounds. However, noise masking techniques can become uncomfortable to workers in the space over time as they become aware of, or effected by, the masking sounds. Natural or biophilic sounds have been used in order to reduce the discomfort generated by white or pink noise.

In the workplace, especially open collaboration environments in which cubicles are used as workspaces, and other environments where individuals may wear headphones for relaxation and communication purposes, individuals are often in situations where they need to openly approach other colleagues without a notion of whether that person is available.

This creates awkward and unproductive intrusions to persons who may need to focus on their workflow, meetings and communication in general. Also, this type of intrusion can be a problem for individuals who might be working in confidential or private information, and want to keep their current work protected.

It is desirable to provide a means providing visual indications of status or tasks in open office environments and in other environments that can be attractive, unobtrusive and effective.

SUMMARY

A visual task or status indicator is described that comprises a tube having a riser region extending away from a base and an illumination output region distal to the riser region from the base. The tube has the tube wall comprising an optical diffuser material at least in the illumination output region. The waveguide, such as a polycarbonate strand or other optical fiber or a bundle of optical fibers, has a length between the proximal and distal ends that is enclosed within and extending through the riser region into the illumination output region of the tube. The waveguide is configured, such as by treating the surface, to emit light laterally in the illumination output region of the tube to directly illuminate the optical diffuser material in the tube wall. Also, the waveguide can be configured to confine light within the waveguide outside of the illumination output region.

A light source is coupled to the waveguide, such as at a proximal end, or otherwise. The light source can have a plurality of output light modes, including various colors or intensities or patterns of colors and intensities. Control circuitry is connected to the light source to select the output light modes in response to a control signal.

To an ordinary observer, the tube can appear hollow and translucent. Light can be delivered through the waveguide and appear to bloom only in the illumination output region at the uppermost portion of the tube. This can result in creating a "floating internal luminescence" ambience for the visual indicator.

In some embodiments of an indicator described herein, the waveguide can be a plurality of optical fibers configured in a bundle. The waveguide can be configured to emit light laterally in the illumination output region of the tube, while confining light in the riser region of the tube. The light source can be configured to couple light into the waveguides in the bundle. Also in some embodiments, each waveguide in the bundle, or subsets of waveguides in the bundle, can be controlled independently to create more complex visual indicator patterns of light with the "floating internal luminescence" ambience.

In an example described herein, a sheath surrounding the bundle, or the surface of a single fiber, can be treated to form a pattern of surface features in the illumination output region of the tube. The light visible when the light source is on can have varying intensity according to the patterned surface features on the waveguides. The patterned surface features can have a simply ornamental design, or have more complex characteristics such as numbers, text or "iconography".

A unique task/status light as described herein can have a riser seeming to be "hollow" and translucent. Using a waveguide like a polycarbonate tubing or strand, with a remote light source in the base or in the hub, light is pushed invisibly through the tube, only blooming light at a treated upper most portion to create a very distinct "floating" ambience, creating a magical "where are the actual electronics and lighting components in this assembly?" experience.

As deployed in an open office environment, and similar places, the visual indicators can be cooperatively controlled, creating controlled floating light displays for task or status indication purposes, or other purposes.

Also described is an embodiment including a base or mount configured to support the tube in a vertical disposition over a workspace surface. In this embodiment, the illumination output region is spaced above the workspace surface by the riser region of the tube. The light source can be disposed remotely from the tube, with a length of optical fiber or other waveguide material connected to or continuous with the waveguide in the tube to deliver the light to the waveguide in the tube. In this manner, the light source can be hidden from view. Also the light source can be coupled to a controller that acts as a hub for a plurality of indicators, distributing the light by waveguide to the indicators under its control.

A decorative lighting source for task or status indications is provided to aid in workplace productivity and etiquette, while developing the ability to specifically tune the indicators to each workplace application. Making the indicator remotely located from the control hub having the light source and control circuits, enables the actual assembly of the indicator be much more compact and beautifully small on a desk, reducing clutter and increasing usable space while maintaining function.

In other embodiments, an indicator as described herein can be mounted on a piece of equipment, such as a computer system rack or a headphone. There may be a plurality of indicators mounted on a single piece of equipment. The illumination output region of each of the plurality of indicators can be disposed at a different location on the equipment selected to provide a desirable visual indicator of a task or status, for example. In this manner, a central controller or hub can be used to provide a light, and to control the display mode of the light, for a plurality of indicators coupled to the hub by optical fibers or waveguides.

Other aspects and advantages of the present invention can be seen on review of the drawings, the detailed description and the claims, which follow.

DETAILED DESCRIPTION

A detailed description of embodiments of the present technology is provided with reference to the FIGS. 1-6.

Figure 1:
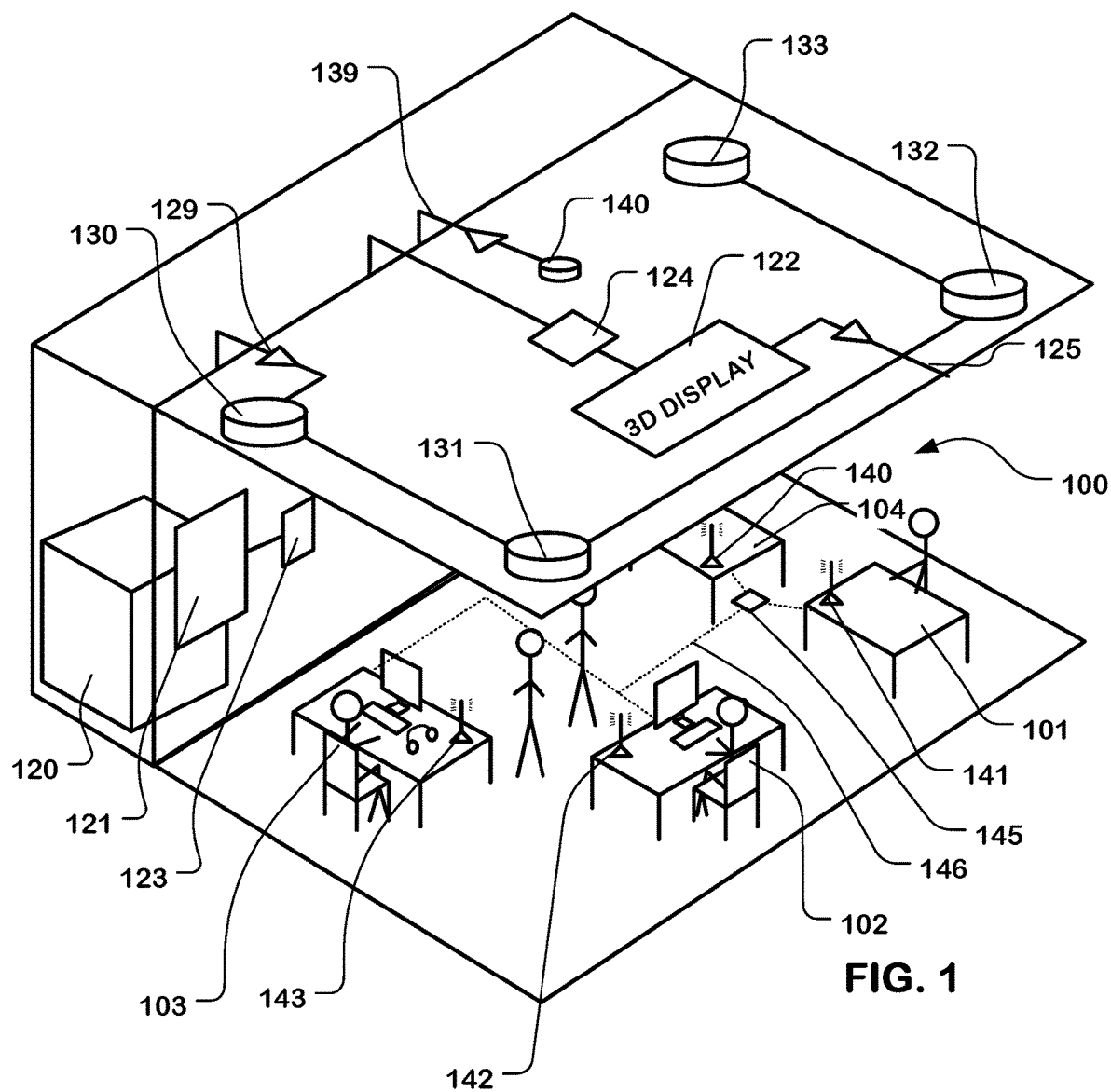
FIG. 1 is a simplified diagram of an open office environment including visual indicators disposed on workspace surfaces as described herein.

FIG. 1 illustrates an example of a soundscape system deployed in an open office environment. The open office environment includes workspace 100 in which a number of workstations 101, 102, 103, 104 are arranged.

The soundscape system includes a computer system 120 which can execute soundscape server programs, in this example, which manage operation of the components of the soundscape system. In other examples, computer system 120 can be an on-premises network node, and include a communication link to a remote network node which executes soundscape management services, by which the soundscape is coordinated using cloud-based soundscape server programs accessed for example via the Internet.

A plurality of speakers 130, 131, 132, 133 arrayed around the workspace 100, in the ceiling in this example, is used to generate a soundscape sound. An audio driver 129 drives the soundscape tracks to produce the sound provided by the soundscape server via the computer system 120. The sound can comprise biophilic or natural sounds, such as flowing water and a gentle breeze through leaves.

The system includes a wall mounted display 121 which plays video content provided by a video player 123, which is in turn coupled to the computer system 120. The display 121 can be characterized as a digital window.

The system includes ceiling mounted 3D display 122 which plays video content provided by a video player 124, which is in turn coupled to the computer system 120. The 3D display 122 can be coupled to a source of image data that causes generation of an interpretable time varying image suggestive of a source of the sound in the environment. The displayed time varying image can comprise images interpretable as flowing water for example, or leaves moving in a gentle breeze. The source of image data can be an on-premises computer system 120, a cloud-based server accessed via the internet, or other source. There may be a plurality of ceiling mounted 3D displays coupled via an amplifier on line 125 to the video player 124.

In this example, a distraction sensor 140 is coupled via an amplifier on line 139 to the computer system 120, the output of which can be utilized by the soundscape server programs to adjust and change the soundscape audio track and video content being executed at any particular time.

Visual task or status indicators 140, 141, 142, 143, such as described below, are disposed on the surfaces of workstations (i.e. desktops or cubicles) in the environment. The indicators 140-143 are coupled by cabling 146 to a hub 145 in which control circuitry controls the mode of illumination in each of the indicators 140-143. In some cases, the indicators can be independently controlled to indicate different statuses and tasks at the various workstations. In some embodiments, the cabling 146 comprises optical fibers or other waveguides which carry light from light sources in the hub 145 to each of the indicators 140-143. In other embodiments, the cabling 146 can comprise electrical cabling carrying control signals, which can include electrical power, from the hub 145 to light sources in the base of the indicators 140-143. In yet other embodiments, the indicators may be coupled to the hub 145 by wireless connection.

The hub 145 can be coupled to a computer system (e.g. 120) in a soundscape environment or otherwise coupled to a server used to provide control signals to the hub. The status or tasks to be indicated at the indicators in the respective workstations can be provided by users in a variety of manners, including for example using applications executed on personal devices or computers which communicate with the server. Also, the status or tasks to be indicated can be controlled generally under control of the environment server using a variety of sources of information.

Figure 2:
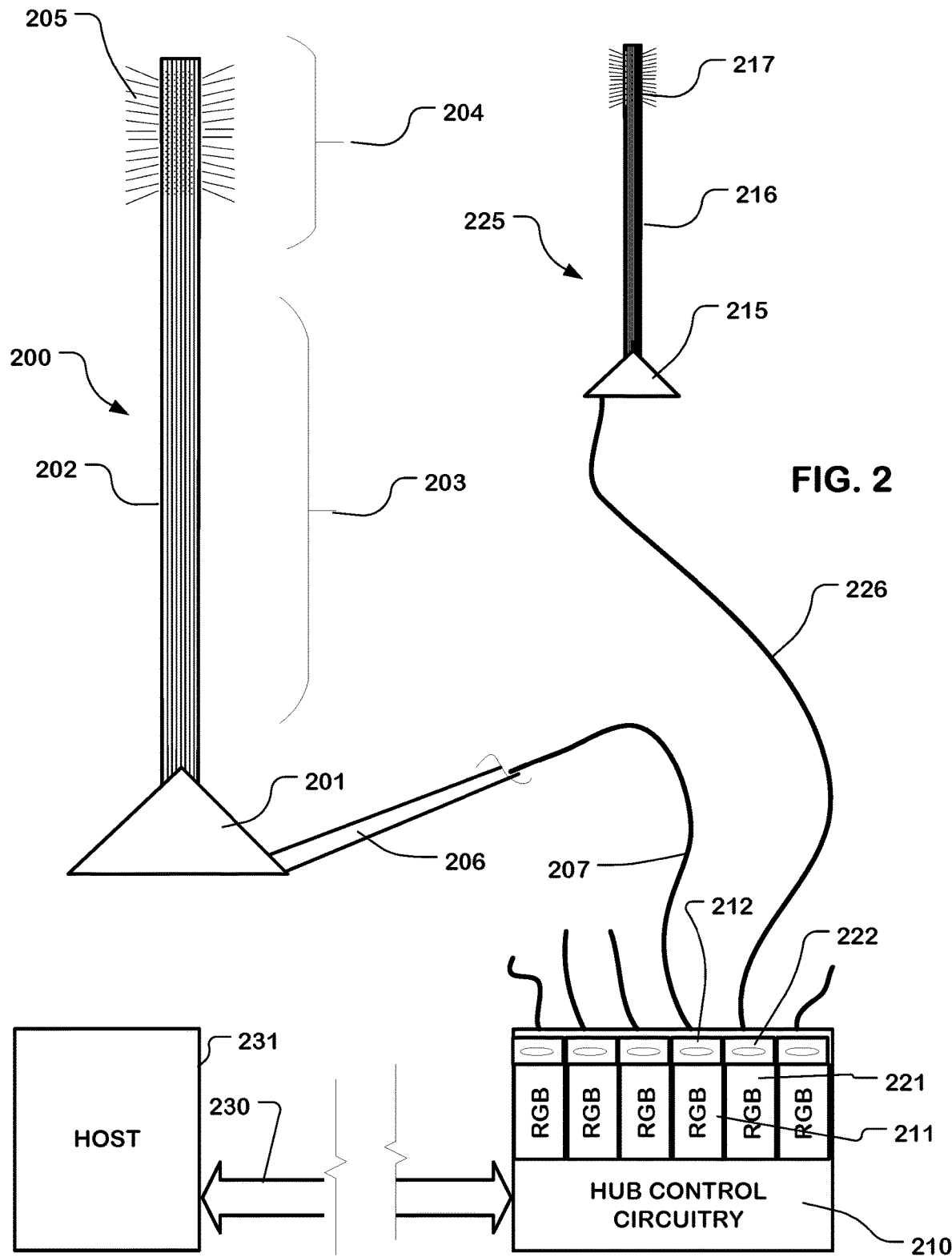
FIG. 2 illustrates a visual task or status illumination system including a visual indicator as described herein coupled for communication of light, with a plurality of other visual indicators, to a hub in which light sources are deployed.

FIG. 2 illustrates a visual task or status illumination system including a visual task or status indicator 200 that comprises a base 201, and a diffuser tube 202 having a riser region 203 and an illumination output region 204. An indicator illumination schematically represented at 205 is output by the indicator in the illumination output region 204. The base 201 includes a mount configured to support the diffuser tube 202 in a vertical disposition over for example a workspace surface. The riser region 203 of the tube extends above the base 201 to the illumination output region 204.

The riser region 203 is disposed in a proximal position relative to the base 201. The illumination output region 204 is disposed distally relative to the riser region 203, and can be disposed at the end of the tube 202.

The riser region 203 and the illumination output region 204 are straight and vertical in this example, but can be curved or take other shapes as suits a particular implementation.

Because the implementation of the indicator 200 in this example is configured for placement on a workspace surface, the term "riser" is utilized to indicate that the illumination output region is disposed at a position spaced away from the base 201, in an elevated position above the surface. In some embodiments, the tube may be disposed horizontally or in a slanted manner. Thus, use of the term "riser" does not indicate necessarily a vertical spacing for the purposes of this disclosure, but rather more generally any spacing away from the base or mount.

In FIG. 2, the diffuser tube 202 extends the full length from the base 201 to the illumination output region 204. In other embodiments, the diffuser tube may comprise only a portion of that length.

The diffuser tube 202 is hollow with a waveguide such as an optical fiber or bundle of optical fibers disposed inside. The optical fibers are configured to confine light through the riser region 203, and to emit light laterally in the illumination output region 204. The fibers can be configured to emit light by treating the surfaces of the fibers in a way that interrupts the total internal reflection of the light inside the fibers allowing the light to leak. For example, using a polycarbonate strand as the waveguide, the surface can be treated by dipping the strand in a solvent such as acetone to induce pocking of the surface. Also, the surface could be physically abraded in other examples.

In this example, a waveguide 206, such as an optical fiber or optical fiber bundle, extends from the base 201 through a length of cabling 207 to a hub that includes a light source 211 and coupling optics 212. The waveguide 206 can be coupled to the waveguide inside the tube 202 by a coupling configuration inside the base 201. In other embodiments, the waveguide 206 can be continuous with the waveguide inside the tube 202, in that the waveguide inside the tube 202 is part of the waveguide 206.

The system includes other status or task indicators, such as indicator 225 comprising a base 215 and a diffuser tube 216 with a waveguide disposed inside that emits light 217 in an illumination output region. In this example, the indicator 225 is coupled by cabling 226 to a light source 221 by coupling optics 222 in the hub. As indicated, the hub can include a plurality of additional light sources coupled to other cables for controlling a number of indicators in the system.

Also, as indicated in FIG. 2, the hub includes hub control circuitry 210 to select output light modes for the plurality of indicators. The hub control circuitry 210 can control the light sources (e.g. 211) to output different modes of light. Different modes of light can comprise different colors of light, different intensities of light, sequences of varying colors and intensities, and so on, individually applied to the various indicators under its control. The light source coupled to the proximal end of a particular cable or fiber can have the ability to produce a plurality of output light colors. The control circuitry can apply control signals to selectively produce different colors of light to be coupled into a fiber or fibers in the cable, for delivery to the indicator at the distal end of the cable. In some embodiments, the control circuitry can apply control signals to selectively produce different sequences of colors, different sequences of intensities or both different sequences of colors and intensities, in the light to be coupled into a fiber or fibers in the cable, for delivery to the indicator at the distal end of the cable.

The control circuitry 210 can operate in response to control signals provided by a host system 231 such as the server discussed above. The host system 231 can communicate with the control circuitry 210 by a communication channel 230 that can be a corded or wireless (radio) channel as suits a particular implementation.

The diffuser tubes used in the indicators as described herein can comprise a variety materials. The materials are chosen to diffuse the illumination emitted from the fiber or fibers inside the tube to blur and blend the light to create an appearance of a floating light source. Representative materials can include acrylics, polycarbonate tubes, or polycarbonate films which have sanded or textured surfaces, are impregnated with light diffusing additives, or are both textured and combined with light diffusing additives. Diffuser tube materials can be cut, formed and molded into complex shapes.

Each light source (e.g. 211, 221) can comprise colored lights, such as LEDs or laser diodes, producing light in an RGB color spectrum. In a representative system, each light source includes red, green and blue LEDs, and can be used to generate colored light in the RGB color space. Other types of light sources can be used as well, including single color lights.

In embodiments in which the cabling 207 comprises a bundle of optical cables, the light source can divide different colors to different cables in the bundle.

Figure 3:
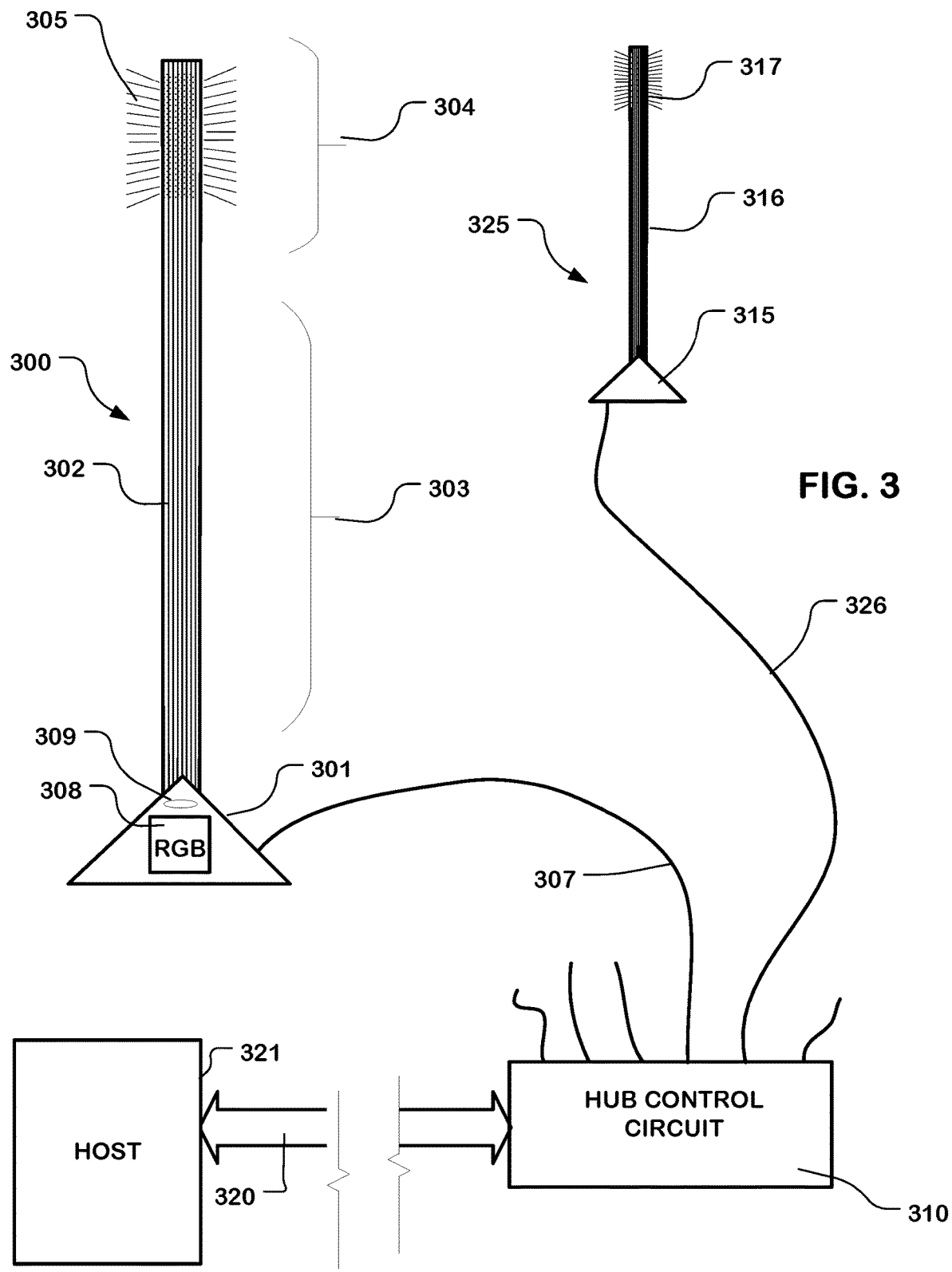
FIG. 3 illustrates a visual task or status illumination system including a visual indicator including a local light source, as described herein coupled for communication of control signals along with a plurality of other visual indicators to a hub.

FIG. 3 illustrates a visual task or status illumination system in an alternative in which light sources are disposed in the base of the indicators. Thus, the system includes a visual task or status indicator 300 that comprises a base 301, and a diffuser tube 302 having a riser region 303 and an illumination output region 304. An indicator illumination schematically represented at 305 is output by the indicator in the illumination output region 304. The base 301 includes a mount configured to support the diffuser tube 302 in a vertical disposition over a workspace surface, for example. The riser region 303 of the tube extends above the base 301 to the illumination output region 304.

The riser region 303 is disposed in a proximal position relative to the base 301. The illumination output region 304 is disposed distally relative to the riser region 303, and can be disposed at the end of the tube 302.

The riser region 303 and the illumination output region 304 are straight and vertical in this example, but can be curved or take other shapes as suits a particular implementation.

In FIG. 3, the diffuser tube 302 extends the full length from the base 301 to the illumination output region 304. In other embodiments, the diffuser tube may comprise only a portion of that length.

The diffuser tube 302 is hollow with a waveguide such as an optical fiber or bundle of optical fibers disposed inside. The optical fibers are configured to confine light through the riser region 303, and to emit light laterally in the illumination output region 304. The fibers can be configured to emit light by treating the surfaces of the fibers in a way that interrupts the total internal reflection of the light inside the fibers allowing the light to leak.

The base 301 includes a light source 308 and coupling optics 309 for coupling light from the light source 308 to the waveguide inside the diffuser tube 302. The light source 308 can comprise colored LEDs or laser diodes arranged to deliver light in an RGB color spectrum as discussed above, or other types of light sources. The light source 308 coupled to the proximal end of the waveguide can have the ability to produce a plurality of output light colors.

In this example, electrical cabling 307 extends from the base 301 to a hub that includes control circuitry 310, and carries control signals from the hub. The cable can also carry electrical power to power the light sources in the base 301, as a separate line. Also, the control signals can comprise modulated power signals in some embodiments. The control circuitry can apply control signals to selectively produce different colors of light to be coupled into the waveguide.

The system includes other status or task indicators, such as indicator 325 comprising a base 315 and diffuser tube 316, with a waveguide disposed inside that emits light 317 in an illumination output region. In this example, the indicator 325 is coupled by cabling 326 to the hub. As indicated, the hub can be connected by cables to a plurality of additional indicators having local light sources. In the embodiment of FIG. 3, electrical cabling (e.g. 307, 326) can be replaced by wireless connections utilizing radios configured for communicating data, including for example "Bluetooth" radio or "Wi-Fi" radio, with complementary radios and power sources at the indicators.

Also, as indicated in FIG. 3, the hub includes hub control circuitry 310 to select output light modes for the plurality of indicators. The hub control circuitry 310 can control the light sources (e.g. 308) at the indicators to output different modes of light. Different modes of light can comprise different colors of light, different intensities of light, sequences of varying colors and intensities, and so on, individually applied to the various indicators under its control.

The control circuitry 310 can operate in response to control signals provided by a host system 321, such as the server discussed above. The host system 321 can communicate with the control circuitry 310 by a communication channel 320 that can be a corded or wireless (radio) channel as suits a particular implementation.

Figures 4A, 4B:
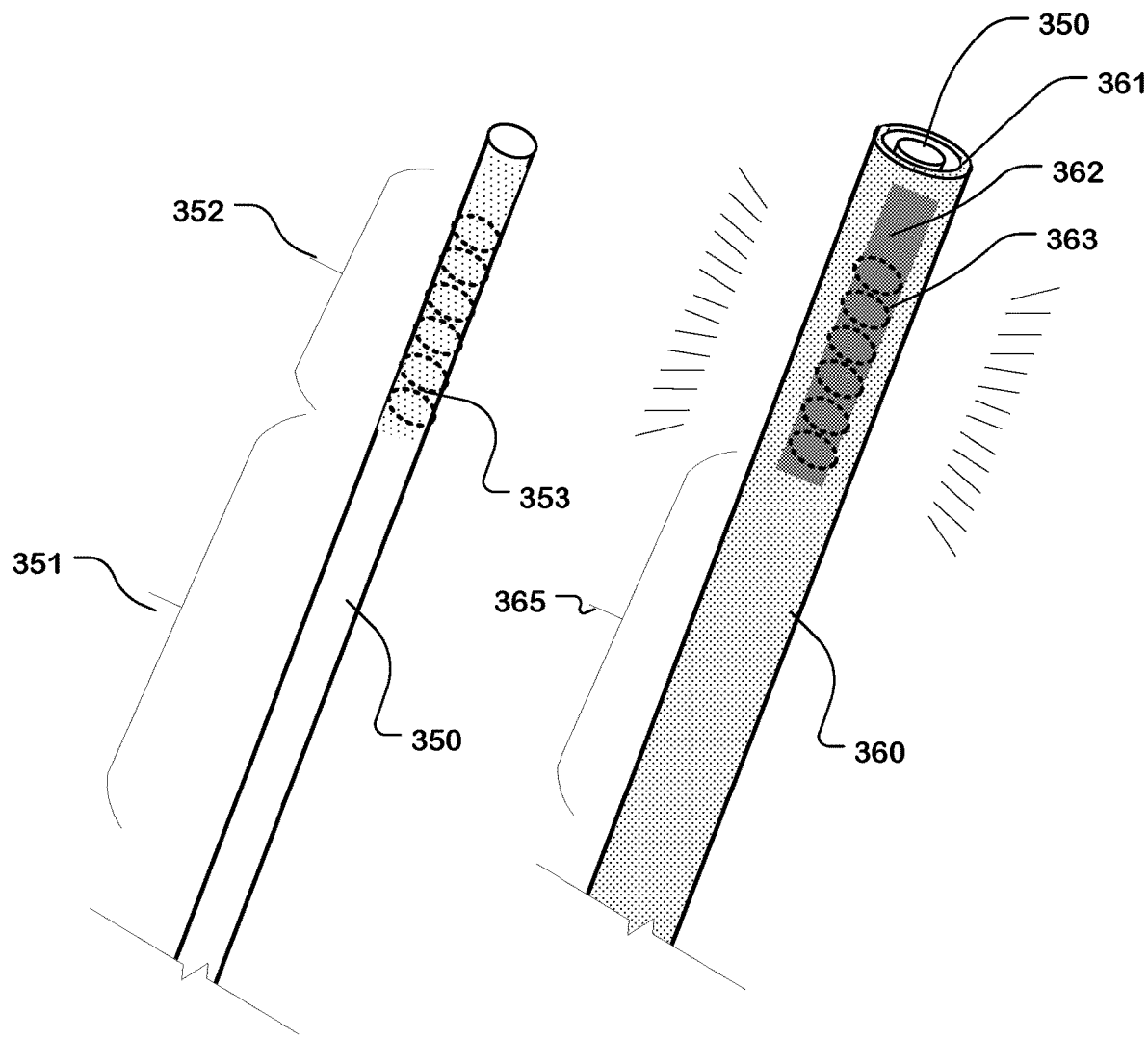
FIG. 4A and FIG. 4B illustrate an internal waveguide and a diffuser tube, respectively, according to one embodiment of a visual indicator as described herein.

FIG. 4A shows a waveguide 350, such as a polycarbonate strand or other type of optical fiber, which can be disposed inside a diffuser tube as illustrated in FIG. 4B in an embodiment of an indicator like those described above. Using polycarbonate strands for the waveguide, the strands can be from less than one millimeter to about 5 millimeters in diameter in example systems, used as single strands or in bundles. Of course smaller and larger fibers or waveguides can be used.

The waveguide 350 includes a riser region 351, and an illumination output region 352. The surface of the waveguide 350 is treated in a manner suitable for the particular waveguide technology, in the illumination output region 352 as represented by the shading in order to suppress the total internal reflection of light transmitted down the waveguide 350. As a result, illumination leaks laterally out of the waveguide 350. In this example, the waveguide 350 has patterned surface features (e.g. 353) represented by dashed circles surrounding the waveguide 350, in the illumination output region 352. The patterned surface features cause light leaking laterally from the waveguide 350 to have varying intensity according to the patterned surface features. In this example, the patterned surface features are simply ornamental. In other embodiments, the patterned surface features can comprise numbers, text or iconography to represent more complex information.

FIG. 4B illustrates a diffuser tube 360 having a riser region 365 and an illumination output region which corresponds with the illumination output region 352 of the waveguide. The waveguide 350 is disposed inside the diffuser tube 360. The diffuser tube 360 has tube walls 361 that comprise an optical diffuser material as discussed above, at least in the illumination output region. The illumination output region 352 of the waveguide 350 is disposed inside the tube 360, and configured to emit light laterally in the illumination output region of the tube to directly illuminate the tube wall.

FIG. 4B illustrates a background pattern of illumination represented by drawing feature 362 corresponding with the light being emitted laterally in the illumination output region 352 of the waveguide 350. Also, a pattern 363 of illumination corresponding with the varying pattern of intensities induced by the features 353 in the waveguide 350 is illustrated.

In the illustrated embodiment, the tube wall 361 is continuous through the illumination output region and the riser region 365 of the tube 360. Also, in embodiments of the indicator, the tube 360 is translucent along its length through the illumination output region and the riser region 365. Also, the waveguide 350 can comprise a clear or neutral colored strand of polycarbonate or glass. This combination of a translucent tube 360 and a clear or neutral colored waveguide results in a structure that appears to an ordinary observer when the illumination output region is not illuminated to be continuous from the riser region 365 through the illumination output region. Also, when the illumination output region is illuminated, the structure appears to have a "floating" illumination region (drawing feature 362) disposed within the translucent tube 360 with a soft or gradated transition between the regions of no illumination of the riser region 365 into the illumination output region.

Figures 5A, 5B:
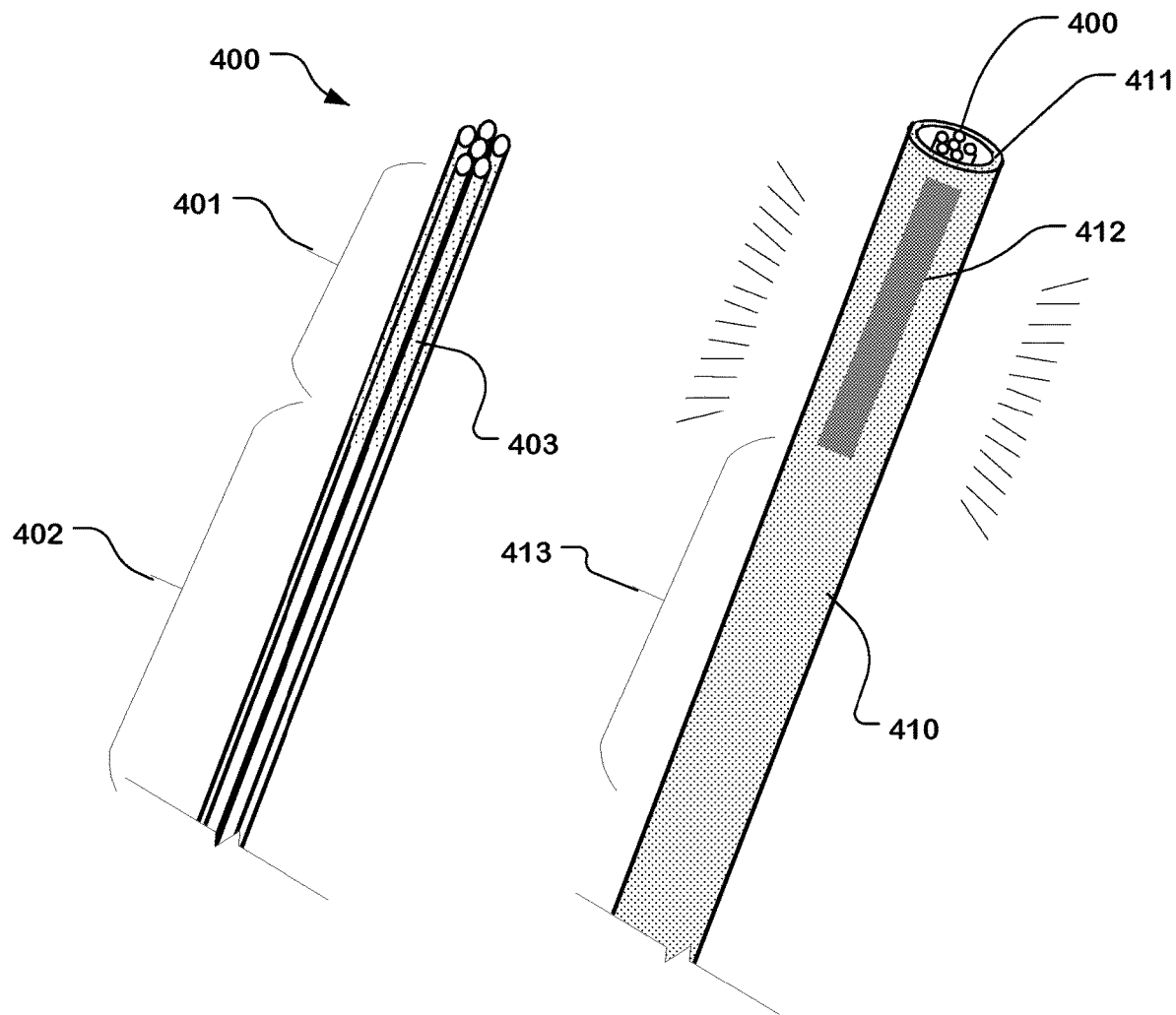
FIG. 5A and FIG. 5B illustrate an internal bundle waveguide and a diffuser tube, respectively, according to another embodiment of a visual indicator as described herein.

FIG. 5A shows a bundle 400 of fibers, including fiber 403 acting as a waveguide as discussed above for delivering light to an illumination output region of an indicator. The bundle 400 can be disposed inside a diffuser tube as illustrated in FIG. 5B in an embodiment of an indicator like those described above.

The fiber 403 and the other fibers in the bundle 400 can comprise a polycarbonate strand or other type of optical fiber. In the illustration there are six fibers in the bundle 400. Of course, there can be fewer than six, and many more than six, as suits a particular implementation.

The bundle 400 includes a riser region 402, in which light transmitted down the fiber is confined, and an illumination output region 401 in which the fibers are treated to emit light laterally as discussed above.

In this embodiment, the surface of the fiber 403 and the other fibers in the bundle are treated uniformly, and thereby laterally emit light in a relatively uniform distribution.

In FIG. 5B, the diffuser tube 410 is illustrated having a riser region 413 and an illumination output region which corresponds with the illumination output region 401 of the bundle 400. The bundle 400 is disposed inside the diffuser tube 410. Diffuser tube 410 has a tube wall 411 that comprises an optical diffuser material as discussed above, at least in the illumination output region. Illumination output region 401 of the bundle 400 is disposed inside the tube 410, and configured to emit light laterally in the illumination output region of the tube to directly illuminate the tube wall.

As shown in FIG. 5B, the diffuser tube 410 also has uniformly treated sides to uniformly diffuse light emitted from the bundle 400. FIG. 5B illustrates a region 412 with a relatively uniform illumination pattern corresponding with the illumination output region 401 in the bundle 400.

In the illustrated embodiment, the tube wall 411 is continuous through the illumination output region and the riser region 413 of the tube 410. Also, in embodiments of the indicator, the tube 410 is translucent along its length through the illumination output region and the riser region 413. The bundle 400 can have a neutral color which results in the appearance of a hollow tube filled with a neutral colored material. As a result, the combination of a translucent tube 410 and a neutral colored bundle results in a structure that appears to an ordinary observer when the illumination output region is not illuminated to be continuous from the riser region 413 through the illumination output region. Also, when the illumination output region is illuminated, the structure appears to have a "floating" illumination region 412 disposed within the translucent tube 410 with a soft, gradated transition between the regions of no illumination in the riser region 413 and the illumination output region.

It should be understood that the embodiment of FIGS. 4A and 4B having a single strand waveguide can be modified to include a bundle, such as the bundle 400 of FIG. 5A. Also, the bundle 400 of FIG. 5A can be treated with a pattern to cause varying intensity patterns of illumination to be admitted laterally. In one approach, the waveguide bundle 400 can include a sheath of clear material surrounding the optical fiber, and having an etched pattern to cause the patterns of varying intensity to directly light the diffuser tube 410.

Figure 6:
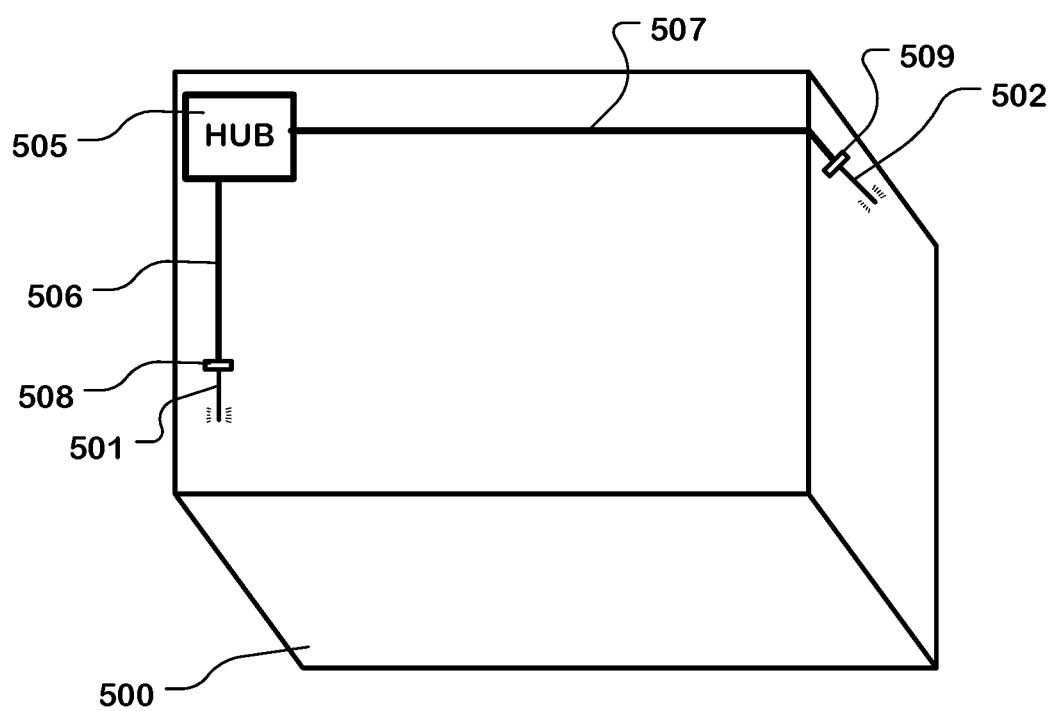
FIG. 6 schematically illustrates a piece of equipment including a plurality of visual indicators disposed thereon, and coupled to a hub including control circuitry.

FIG. 6 illustrates a piece of equipment 500 (represented heuristically as a box) on which a plurality of visual indicators 501, 502 are disposed. The visual indicators 501, 502 can be implemented according to any of the embodiments discussed above, including a diffuser tube and an optical fiber or waveguide disposed inside the diffuser tube and configured to emit light laterally into an illumination output region of the tube. The diffuser tubes are connected to a base or mount (508, 509) configured to support the tube on the equipment 500 and desired locations. The base or mount 508, 509 can comprise a clasp or other mechanical bracket or means to secure the tube to the equipment 500. Also, in some embodiments, the base or mount 508, 509 can comprise simply glue or a molded feature designed to secure the tube to the equipment. In this embodiment, waveguide cables 506, 507 couple the indicators 501, 502 to a hub 505 in which light sources for the indicators are disposed. The waveguide cables 506, 507 can be flexible optical fibers which are lightweight and easily routed on the equipment 500. The indicators 501, 502 can be quite small in some embodiments.

Examples of equipment 500 on which indicators as described herein can be deployed include computer system racks, metrology equipment, industrial equipment, and smaller devices such as consumer electronic devices like headphones or other audio devices. The hub 505 can contain control circuitry to control the lighting modes of the indicators 501, 502 according to various status or task information provided by the host, by local processors or from other sources.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A visual task or status indicator, comprising:
a tube having a riser region extending away from a proximal end, and an illumination output region distal to the riser region, the tube having a tube wall comprising an optical diffuser material in both the riser region and the illumination output region; and
a waveguide having a proximal end and a distal end, the waveguide including a length between the proximal and distal ends, and the waveguide being enclosed within the riser region of the tube and extending through the riser region into the illumination output region of the tube,
wherein the waveguide is configured to emit light laterally in the illumination output region of the tube to directly illuminate the optical diffuser material in the tube wall, and
wherein the optical diffuser material in both the riser region of the tube and the illumination output region of the tube appears, to an ordinary observer, to be continuous from the riser region through the illumination output region, when the illumination output region is not illuminated by light emitted from the waveguide.

2. The indicator of claim 1, including:
a light source coupled to the proximal end of the waveguide, having a plurality of output light modes, and circuitry to select output light modes in the plurality of output light modes in response to a control signal.

3. The indicator of claim 1, including:
a mount configured to support the tube in a vertical disposition over a workspace surface, and wherein the illumination output region is spaced above the workspace surface by the riser region of the tube, and the waveguide is configured to confine light in the riser region.

4. The indicator of claim 1, wherein the illumination output region of the tube has uniformly treated sides so as to uniformly diffuse the light emitted from the waveguide enclosed within the tube.

5. The indicator of claim 1, wherein the tube wall is translucent in the riser region and the illumination output region.

6. The indicator of claim 1, wherein the waveguide comprises patterned surface features in the illumination output region of the tube to emit light of varying intensity according to the patterned surface features.

7. The indicator of claim 1, wherein the waveguide comprises a plurality of optical fibers disposed within the tube, and is configured to emit light laterally in the illumination output region of the tube to directly illuminate the tube wall, and is configured to confine light in the riser region.

8. The indicator of claim 1, including:
a light source coupled to the proximal end of the waveguide, having a plurality of output light colors; and
control circuitry coupled to the light source, to apply a control signal to selectively connect different colors of light to the waveguide.

* * * * *